US005475914A

United States Patent [19]

Bornhorst, Jr. et al.

[11] Patent Number: 5,475,914

[45] Date of Patent: Dec. 19, 1995

[54] ENGRAVING HEAD WITH CARTRIDGE MOUNTED COMPONENTS

[75] Inventors: Kenneth F. Bornhorst, Jr., Centerville; David R. Seitz, Vandalia; James E. Klinger, Dayton, all of Ohio

[73] Assignee: Ohio Electronic Engravers, Inc., Dayton, Ohio

[21] Appl. No.: 105,911

[22] Filed: Aug. 10, 1993

[51] Int. Cl.$^6$ ................................ B23D 1/30; B23D 7/06

[52] U.S. Cl. ............................ 29/560; 279/83; 409/128; 409/293; 409/298

[58] Field of Search ............................ 358/299; 101/170; 33/21.1; 29/560; 409/128, 131, 132, 175, 178, 180, 184, 195, 199, 201, 208, 214, 218, 293, 298, 310, 327; 279/83, 156, 155; 407/72; 408/233

[56] References Cited

U.S. PATENT DOCUMENTS

| | | | |
|---|---|---|---|
| 1,885,089 | 10/1932 | Dukes | 279/83 X |
| 2,445,903 | 7/1948 | Bentzman | 409/184 |
| 2,769,199 | 11/1956 | Boyajean | 18/1 |
| 4,357,633 | 11/1982 | Buechler | 358/299 |
| 4,438,460 | 3/1984 | Buechler | 358/299 |
| 4,590,578 | 5/1986 | Barto, Jr. et al. | 364/474.36 X |
| 4,805,312 | 2/1989 | Datwyler | 33/18.1 |

OTHER PUBLICATIONS

"Martin Galvanotechnik Galvanoplastie Plating," R. G. Martin AG, CH–4106 Therwil, Erlenstrasse 50, Switzerland, undated brochure.

"Think Boomerang System", Rotogravure Cylinder Making System, Fujitoku Co, Tsukuba, Japan, undated brochure.

"Magnetic Antriebstechnik", Magnetic Ekektromotoren AG, PO Box 267, CH–4410 Liestal, Switzerland, undated brochure.

"Valcus" Screen brochure, undated.

"Datwyler", Max Daetwyler Corporation, 13420 West Reese Blvd., Huntersville, N.C. 28078, undated brochure.

"Twin–Pilot", Maschinenfabrik Kaspar Walter GmbH & Co. KG, Plinganserstrasse 22, 8000 Munchen 70, Germany, undated brochure.

*Primary Examiner*—Steven C. Bishop
*Attorney, Agent, or Firm*—Matthew R. Jenkins

[57] ABSTRACT

An engraver having an engraving head is provided wherein replaceable components, such as tools, of the engraving head are formed with a cartridge-style construction. For example, in one aspect of the engraving head, a cartridge-type diamond stylus is provided having a trapezoidal cross-section for facilitating positive registration and positioning of the stylus within the engraving head. Other tools, such as a shoe and/or burr cutter may also be provided in a detachable cartridge arrangement to facilitate quick mounting and replacement of an existing shoe or burr cutter, respectively, such that the shoe or burr cutter also becomes aligned and registered on the engraving head.

92 Claims, 10 Drawing Sheets

ENGRAVING HEAD WITH CARTRIDGE MOUNTED COMPONENTS

BACKGROUND OF THE INVENTION

1. Field of the Invention

This invention relates to an engraver, and more particularly, to an engraving head having components which are easily mounted to the head and which are easily aligned with a plated cylinder to be engraved.

2. Description of Related Art

The basic principle of electro-mechanical engraving of a gravure cylinder involves rotating a plated cylinder while actuating an electrically driven tool which cuts or engraves cells or lines into the surface of the plated cylinder. The engraved cylinder is normally used in a web-type gravure printing press for printing paper, plastic, metallic film material, or other printed material.

In the gravure printing process, the engraved cylinder is flooded with ink, and a doctor blade wipes off excess ink from the surface so that only the engraved cells contain ink which is transferred to the material being printed. To obtain a high quality print, it is necessary that the cells be very accurately placed or located on the cylinder surface, usually within one or two microns of a desired predetermined location. The depth of the engraved cells must also be accurately controlled since the depth determines the amount of ink transferred which, in turn, determines the shade of gray in a black/white print, for example. In a color print, the amount of ink transferred to the paper or materials is even more critical since multiple colors are typically mixed to produce various shades of all possible colors. A slight variation in the desired amount of ink effects not only the color, but, more importantly, the density of the desired color.

In order to properly control the depth of the cells, the relative location between the plated cylinder and the electrically driven tool, which is typically a diamond stylus, must be accurately controlled. In order to ensure that the stylus is maintained at a constant distance from the plated cylinder as the cylinder rotates in an engraving process, the engraving head containing the stylus is provided with a diamond shoe tool which contacts the cylinder to maintain a desired predetermined spacing between the stylus and the cylinder. In the past, a diamond shoe tool has been used incorporating either a single ball-shaped engaging surface or a flat diamond engaging surface which requires precise tangential alignment relative to the cylinder surface. The ball-shaped diamond shoe tool provides a relatively small radius providing a small contact area between the shoe tool and the cylinder such that the ball shoe tool typically follows the irregularities in the cylinder surface well. However, this small contact area also results in a relatively high force being applied at the point of contact and, as a result, a ball shoe tool cannot be used for multiple pass engraving processes in that the shoe tool tends to distort or otherwise damage the cell walls created by the stylus on earlier passes. The flat diamond shoe tool is normally formed with a size sufficient to permit a better distribution of forces. However, although the flat shoe tools provide better distribution of forces applied to the cylinder than ball shoe tools, the flat shoe design often does not intimately follow the contours of the cylinder surface.

The placement of the diamond stylus within the engraving head of the engraver is also critical to proper formation of the engraved cells. In the past the stylus was mounted to a tool holder which was then located within an elongated aperture formed in a stylus arm wherein the tool holder would be manually positioned at a selected location within the aperture to cause the stylus to project outwardly a desired distance. Once the stylus was located in the desired position, fasteners threaded into the stylus arm were moved into engagement with a clamp member which would then cause the tool holder to frictionally engage the walls defining the aperture in the stylus arm. Typically, the tool holder would be formed with a D-shaped cross section having a flat side and a curved side, wherein the clamping member would engage the flat side of the tool holder and the curved side thereof would be forced into engagement with a cooperating curved surface of the aperture in the stylus arm. Thus, mounting of the stylus within the stylus arm required an operator to perform an alignment procedure in order to ensure that the placement of the stylus within the stylus arm was accurate.

When the stylus exits an engraved cell, a burr of material is commonly created around the edges of the cell, and the burr material is removed by a diamond burr cutter mounted on the engraving head adjacent to the location of the stylus and the diamond shoe tool. Past burr cutters have comprised diamond tools having a cutting edge which was located over the center of an engraved cell or row of engraved cells to remove the burr material. The alignment between the burr cutter and the cylinder would vary with variations in the diameter of the cylinder such that it was necessary for an operator to perform an alignment operation to place the cutter in tangential engagement with the cylinder surface whenever the cylinder diameter was changed.

Accordingly, there is a need for an improved engraving head which provides for simplified mounting and alignment of the stylus within the engraving head, and including a simplified mounting for a self-aligning shoe which provides for improved alignment of the engraving head relative to the cylinder. In addition, there is a need for a burr cutter for use on an engraving head wherein the burr cutter may be used on a variety of cylinder diameters without requiring adjustment of the burr cutter to obtain tangential alignment with the cylinder.

SUMMARY OF THE INVENTION

The present invention provides an improved engraving head which includes a stylus adapted to be quickly aligned within the engraving head, a diamond shoe tool which is adapted to align itself to a surface of a cylinder and a burr cutter which is adapted to be used with a plurality of cylinders having different diameters without requiring manual alignment to accommodate the different cylinder diameters.

In one aspect of the invention, a stylus assembly is provided for use in an engraving apparatus wherein the stylus assembly comprises stylus means and mounting means for receiving the stylus means, the mounting means including positioning means for cooperating with the stylus means to define a predetermined stop position for the stylus means. The mounting means includes a stylus arm including means defining an aperture for receiving the stylus means and the stylus means is preferably in the form of a stylus cartridge including a stylus mounted to a stylus holder.

The aperture in the stylus arm includes an integral end wall for engaging an end of the stylus holder in abutting contact whereby the stylus is caused to project from the stylus arm a predetermined distance toward a cylinder to be engraved.

In addition, the stylus holder is formed having a trapezoidal cross-section wherein opposing angled walls of the stylus holder are adapted to engage cooperating walls within the aperture. The engagement between the walls of the stylus holder and the walls of the aperture cause the stylus cartridge to be angularly oriented and positively positioned within the aperture of the stylus arm.

In another aspect of the invention, a shoe tool assembly is provided which is adapted to engage a surface to be engraved to maintain a predetermined spacing between the engraving head and the surface to be engraved wherein the shoe assembly comprises a support means and shoe means supported by the support means and including at least one non-planar contact means adapted to engage the surface to be engraved. The support means includes a support arm pivotally mounted to the engraving head and the shoe means preferably includes first and second non-planar contact surfaces defined by omni-directional convex diamonds.

The shoe means is mounted in pivotal relationship to the support arm whereby the shoe means may pivot to accommodate surface irregularities in the surface to be engraved such that the shoe tool assembly is self aligning. In addition, the omni-directional convex diamonds provide two distinct contact points for contacting the surface to be engraved to facilitate distributing the contact force exerted on the cylinder surface. Thus, the shoe means may move in contact with previously engraved cells on an engraved cylinder wherein the omni-directional convex diamonds facilitate distributing the contact pressure on the cell walls, thereby preventing the cell walls from being damaged during a multiple pass engraving process.

In yet another aspect of the invention, a burr cutting assembly is provided for use in the engraving apparatus, the cutting assembly comprising tool means having a cutting edge for engaging and cutting burrs on an engraved surface wherein the cutting edge is curved. By providing a curved cutting edge, the cutting assembly is capable of being used with a plurality of cylinders having different diameters wherein the cutting edge will engage each cylinder surface in tangential relationship such that it is not necessary to perform a manual alignment operation in order to obtain proper alignment between the cutting edge and the cylinder surface.

The tool means is supported by a support in fixed relationship thereto and the support is pivotally mounted to the engraving head whereby the tool means may follow any surface irregularities in the cylinder surface.

Further, the stylus assembly, shoe assembly and burr cutting assembly each include surface engaging diamond elements which are cartridge mounted whereby the surface engaging elements may be easily replaced.

Therefore, it is an object of the present invention to provide an engraving head having an improved stylus assembly whereby the stylus may be easily mounted into a predetermined position within the engraving head.

It is another object of the invention to provide an engraving head with an improved shoe assembly for maintaining a predetermined spacing between an engraving head and a surface to be engraved wherein the shoe assembly is self-aligning relative to the surface to be engraved and also permits multi-pass engraving to be performed.

It is yet another object of the present invention to provide a burr cutting assembly wherein alignment of a burr cutter to a cylinder surface is not required in order to obtain tangential contact between the burr cutter and the cylinder surface.

Other objects and advantages of the invention will be apparent from the following description, the accompanying drawings and the appended claims.

BRIEF DESCRIPTION OF THE ACCOMPANYING DRAWINGS

DESCRIPTION OF THE PREFERRED EMBODIMENT

Figure 1:
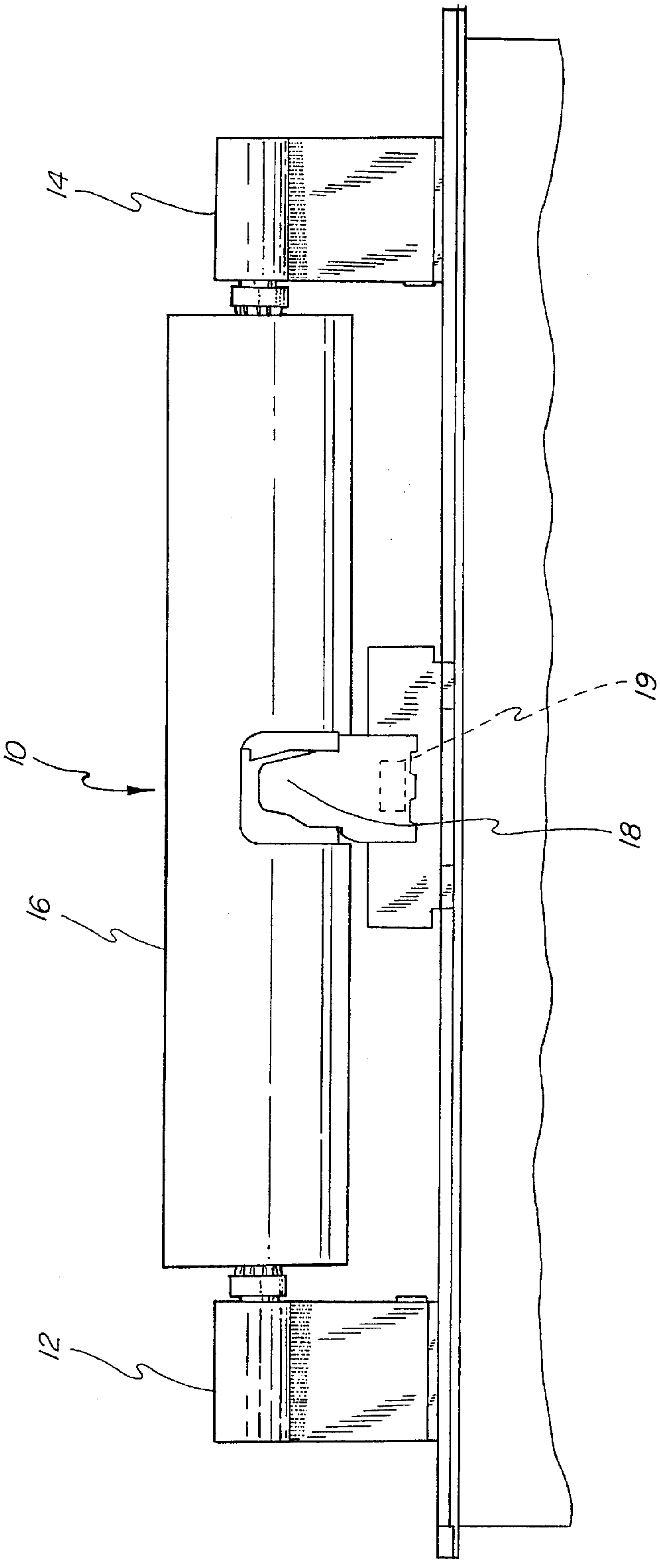
FIG. 1 is an elevational view of an engraver incorporating the engraving head of the present invention.

Referring initially to Fig, 1, the engraving head of the present invention is shown mounted within an engraver 10 which includes a headstock 12 and a tailstock 14 wherein the headstock 12 and the tailstock 14 are adapted to support a plated cylinder 16 therebetween, The engraving head 18 of the present invention is mounted in front of the cylinder 16 for movement longitudinally of the cylinder 16 during an engraving process, In addition, the engraver 10 is provided with a driver, illustrated diagrammatically as element 19, for moving the engraving head toward and away from the cylinder 16, Fig, 2 illustrates the side of the engraving head 18 which faces toward the cylinder 16, The engraving head 18 includes a stylus arm 20 for mounting a stylus cartridge 22 wherein the stylus arm 20 is mounted on an engraving head base 24 and is actuated by a torque motor shaft 21 to move the stylus cartridge 22 toward and away from the cylinder to form engraved cells.

The engraving head 18 further includes a selfaligning shoe tool assembly 26 pivotally mounted to the engraving head base 24, The shoe tool assembly 26 is adapted to contact the cylinder 16 to accurately place the tip of the stylus cartridge 22 at a predetermined location relative to a point of contact between the assembly 26 and the cylinder 16.

Additionally, a burr cutter assembly 28 is provided for removing a burr of material created when the stylus exits the engraved cells. The burr cutter assembly 28 is mounted for movement in an axial direction relative to the cylinder 16 whereby a cutting edge of the burr cutter assembly 28 may be centered over any desired cell or row of cells, such as the next-to-last engraved cell, as will be described in detail below.

Figure 3:
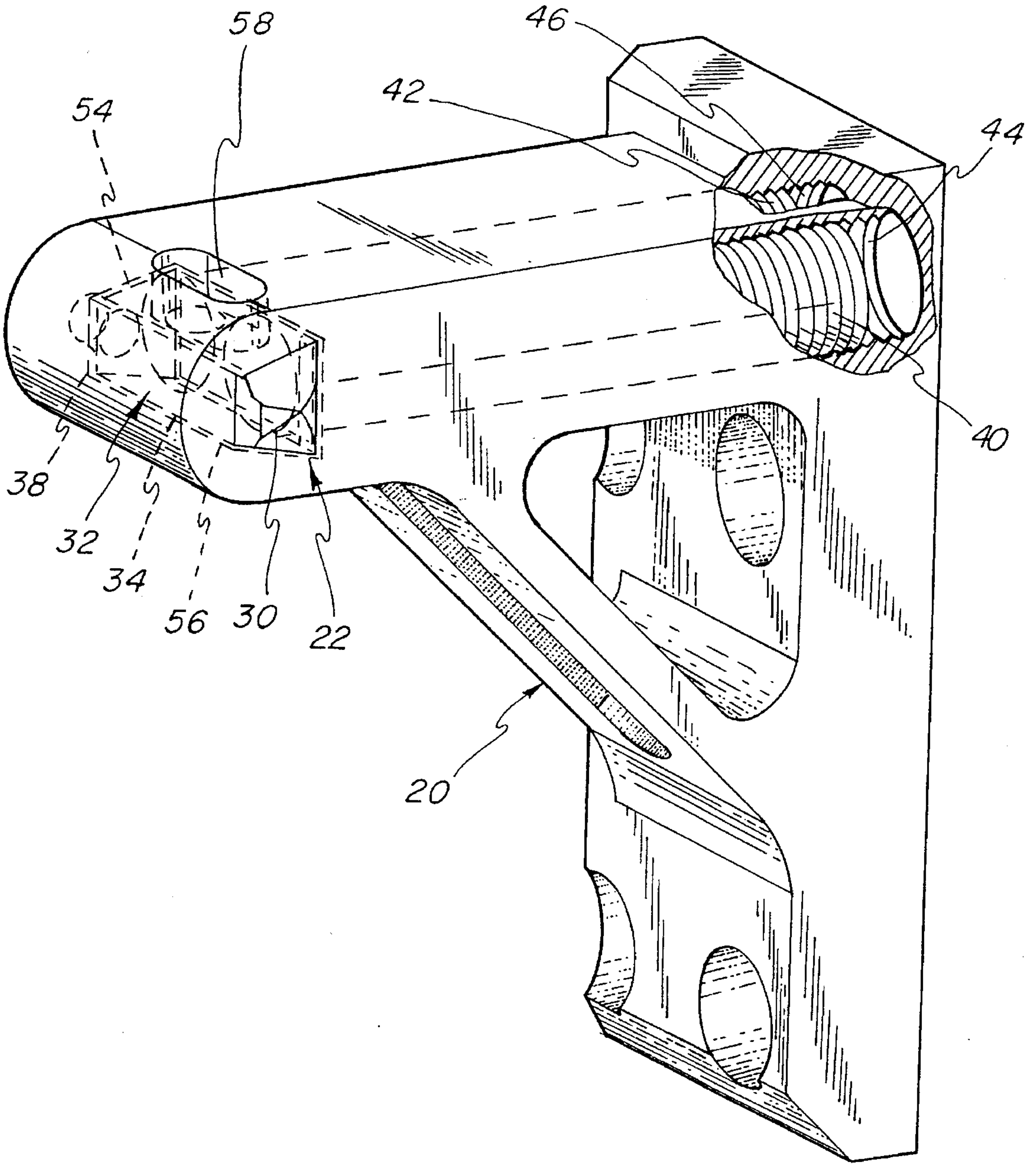
FIG. 3 is a perspective view of the stylus arm showing details relating to the mounting of the stylus.
Figure 4:
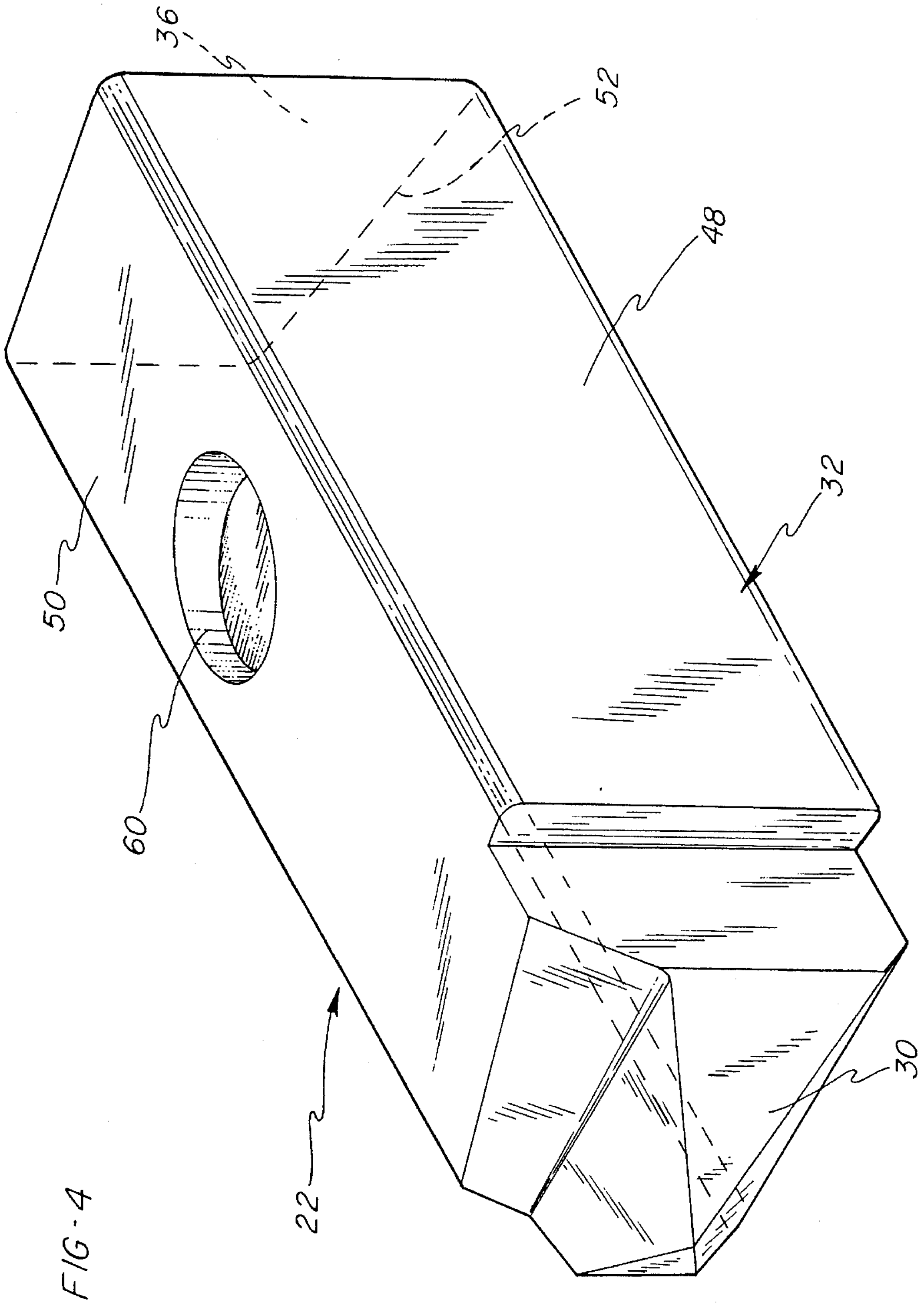
FIG. 4 is a perspective view of the stylus.

Referring to FIGS. 3 and 4, the stylus cartridge 22 of the present invention comprises a diamond stylus 30 anchored to an elongated tool holder 32 having a predetermined length. The diamond stylus 30 defines a conventional pointed tip for engaging a workpiece, such as the surface of a cylinder. The tool holder 32 is formed with a trapezoidal cross-section which is received within a corresponding elongated trapezoidally-shaped aperture 34 formed in the stylus arm 20. During mounting of the stylus cartridge 22 into the aperture 34, the tool holder 32 is moved into the aperture until a rear wall 36 of the tool holder 32 abuts against a stop 38 defined by a rear wall of the aperture 34. Thus, the stylus 30 is positioned to extend a predetermined distance from the stylus arm 20 by simply inserting the stylus cartridge 22 into the aperture 34 until the tool holder 32 engages the stop 38 wherein the amount of extension is controlled by the length of the tool holder 32. Once the cartridge 22 is in position, a pair of fasteners, such as set screws 40, 42, extending transverse to the longitudinal axis of the stylus cartridge 22 and engaged within threaded apertures 44, 46 of the stylus arm 20, may be turned into engagement with the side wall 48 of the tool holder 32. As the screws 40, 42 are tightened down on the tool holder 32, opposing upper and lower tool holder surfaces 50, 52, which are angled toward each other to form the trapezoidal shape, will move into wedging frictional engagement with respective angled upper and lower surfaces 54, 56 of the aperture 34 to firmly lock the cartridge 22 into position and to establish the angular orientation of the stylus 30 relative to the stylus arm 20.

When it is desired to remove the cartridge 22 from the stylus arm 20, a tool (not shown) may be inserted into an elongated slot 58 formed in the top surface of stylus arm 20 above the aperture 34 to engage within a recess 60 formed in the tool holder 32. The tool may then be moved forwardly in the slot 58 to guide the stylus cartridge 22 forwardly out of the aperture 34.

It should be apparent from the above description that by providing a stop 38 formed integrally with the stylus arm 20, a positive stop position is defined for registering with the stylus cartridge 22 to thereby facilitate loading or replacement of the cartridge 22. Further, the trapezoidal geometry for the tool holder 32 and associated stylus arm aperture 34 provides for positive angular positioning of the stylus cartridge 22 relative to the axis of the cylinder 16 and additionally reduces the number of clamp elements required for locking the stylus cartridge 22 in position.

Figure 2:
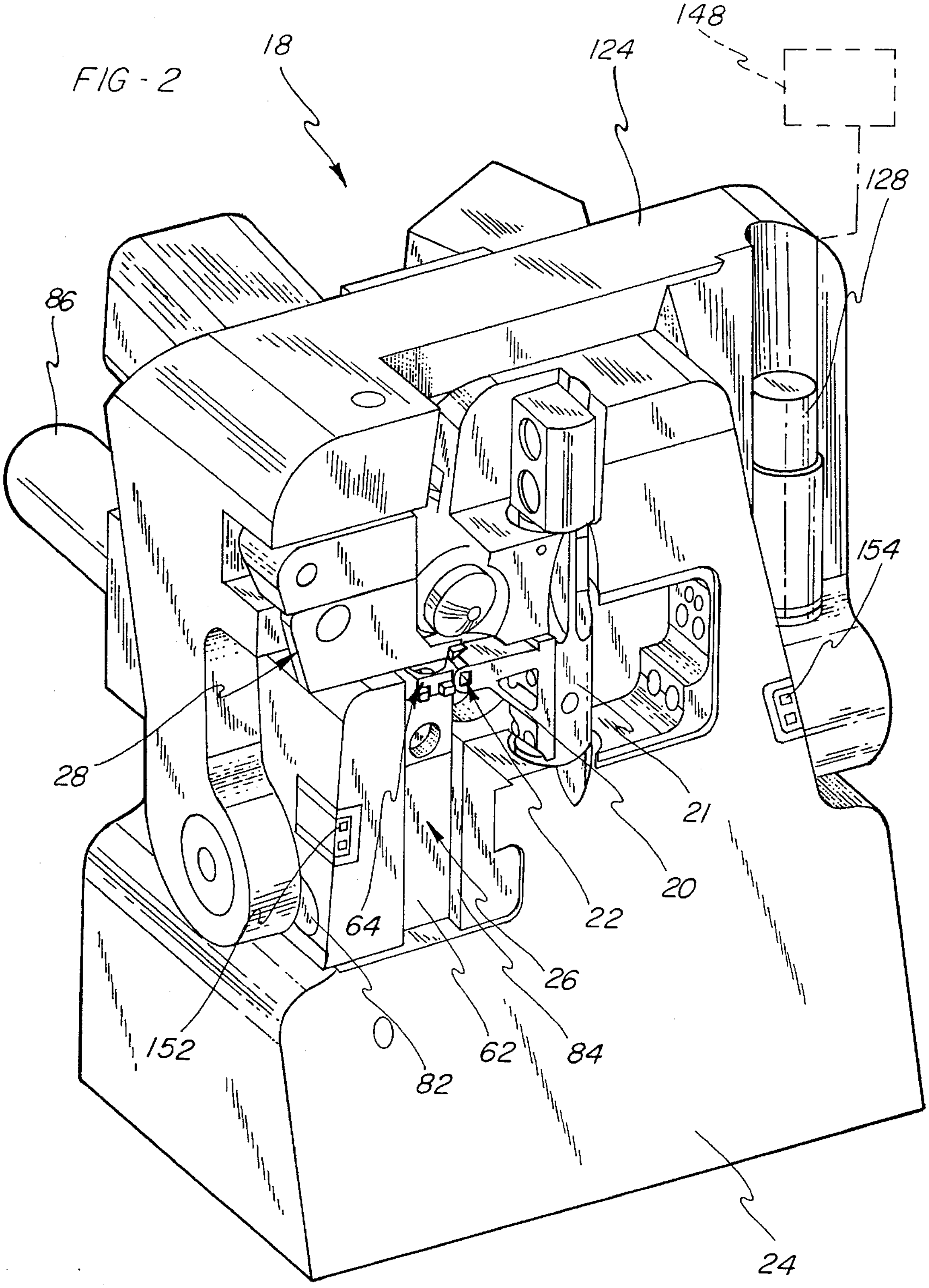
FIG. 2 is a perspective view of the engraving head of the present invention showing the cylinder engaging components thereof.
Figure 5:
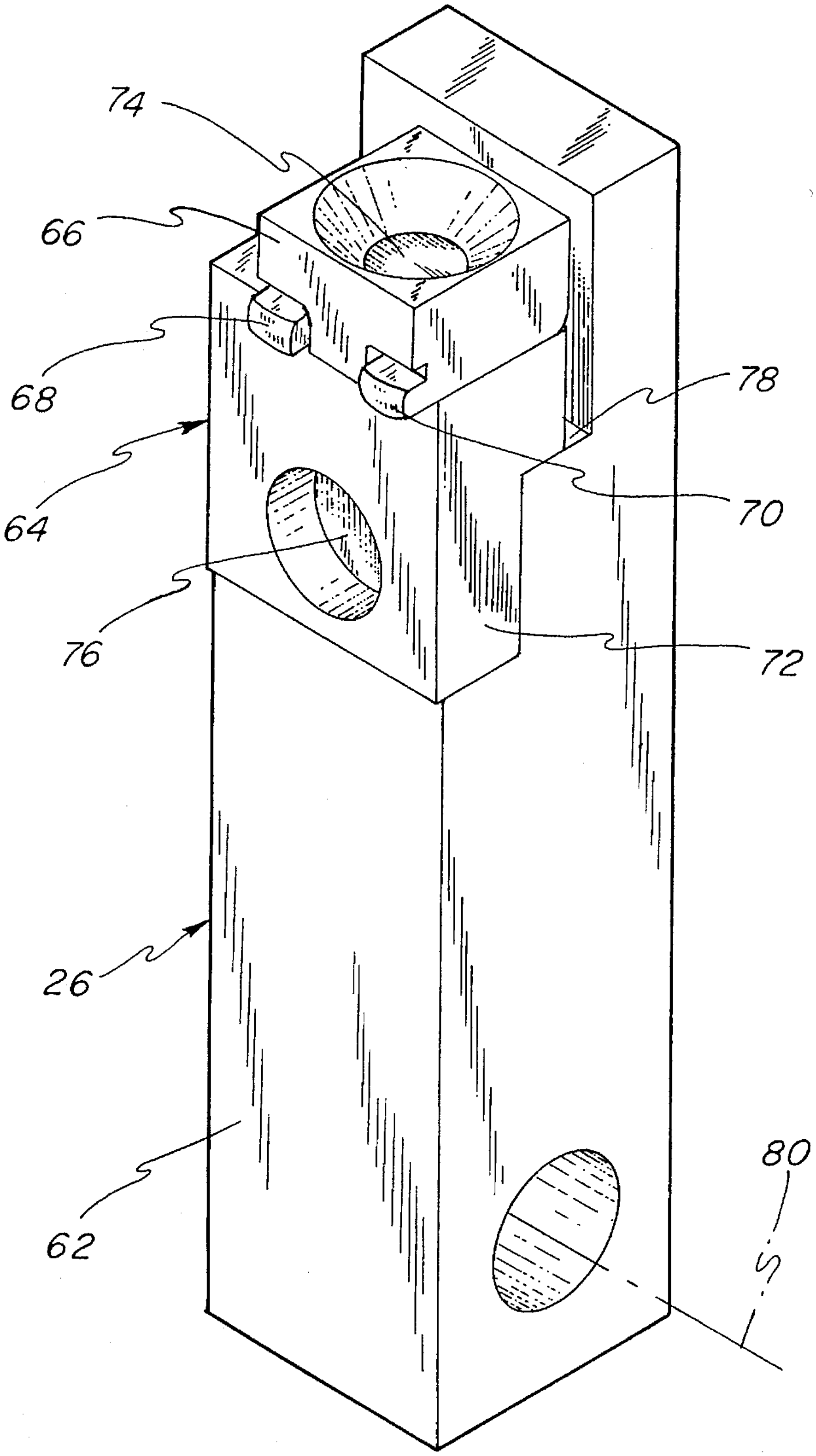
FIG. 5 is a perspective view of a first embodiment of the self-aligning shoe tool.

Referring to FIGS. 2 and 5, the shoe tool assembly 26 of the present invention includes a support arm 62 which is mounted for pivotal movement relative to the engraving head base 24 and which is adapted to support a shoe cartridge 64 carrying a diamond shoe 66 adjacent to the stylus cartridge 22.

As may be seen in FIG. 5, the diamond shoe 66 includes first and second omni-directional diamonds 68,70 which define non-planar or convex surfaces for providing two spaced contact points in engagement with the cylinder. It should be noted that the diamonds 68, 70 may be either natural or formed of a synthetic material having equivalent characteristics.

The diamond shoe 66 is attached to a shoe holder 72 of the cartridge 64 through a pivot connection formed by a pivot pin 74 whereby the diamond shoe 66 is pivotable about a vertical axis in a substantially horizontal plane containing the first and second diamonds 68,70. In addition the shoe cartridge 64 is detachably fastened to the support arm 62 by a pin 76 which immovably registers the shoe holder 72 with a datum shelf 78 on the support arm 62.

The pivot formed by the pin 74 is such that the diamond shoe 66 is capable of pivotal movement relative to the shoe holder 72 to permit the omni-directional convex diamonds 68, 70 to follow irregularities in the surface of the cylinder 16 as it rotates. The support arm 62 pivots about a pivot axis 80, parallel to the axis of the cylinder 16 and perpendicular to the pivot axis of the shoe 66, on a pivot pin (not shown) supported by the engraving head base 24. In addition, the pivot pin (not shown) is preloaded by a bevel spring 82 (see FIG. 2) to eliminate rotational backlash, and the support arm 62 is captured against a bearing surface 84 whereby the support arm 62 is located in an axial direction.

Figure 6:
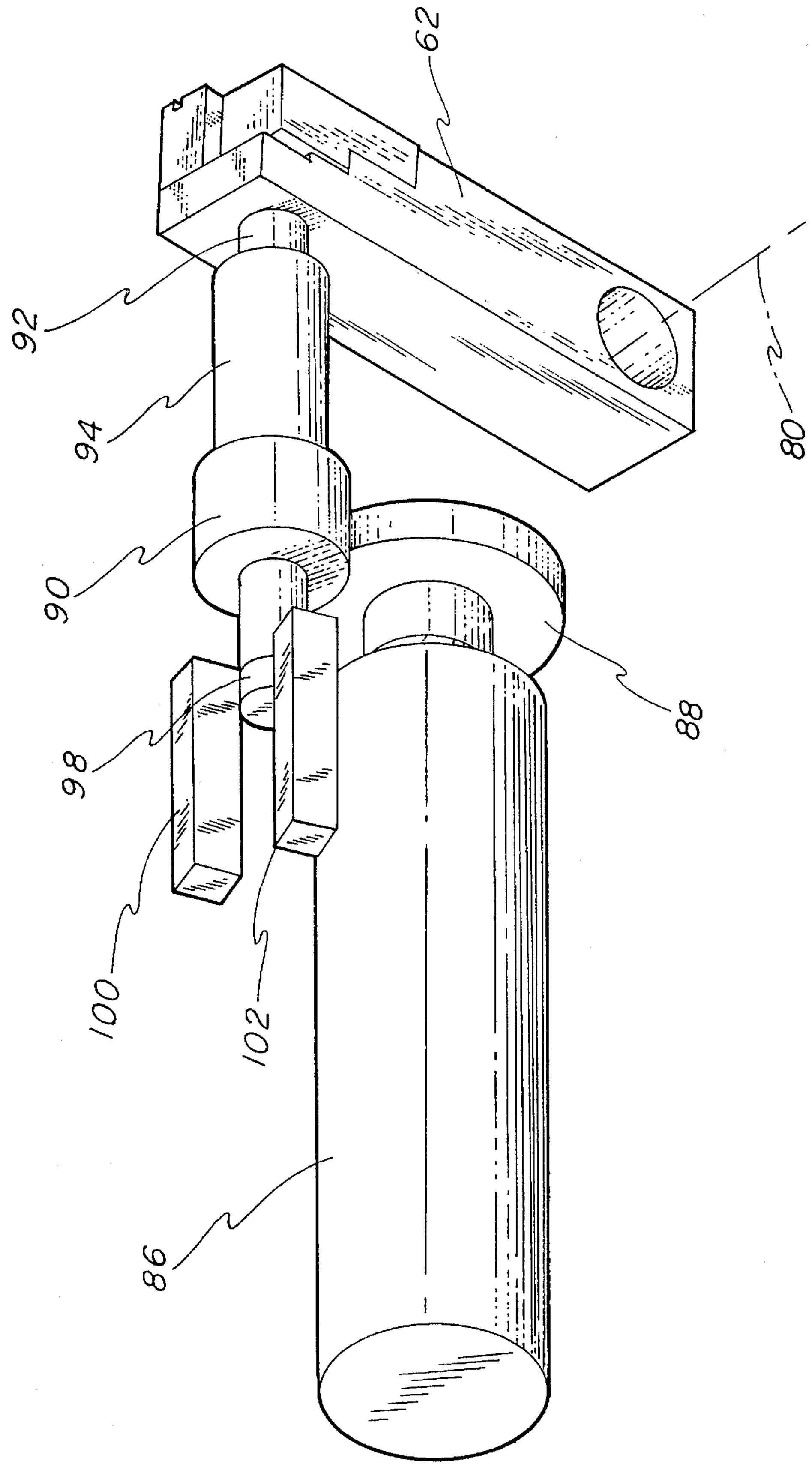
FIG. 6 is a perspective view of the servo drive mechanism for moving the self-aligning shoe tool.

Referring to FIG. 6, the support arm 62 is rotated toward and away from the cylinder 16 by means of a servomotor 86 having an integral gear reducer (not shown) and having additional gear reduction through spur gears 88 and 90 to rotate a threaded spindle 92 mounted to the spur gear 90. The threaded spindle 92 is threadably engaged with a barrel 94 which is rigidly mounted relative to the engaging head base 24. The threaded spindle 92 is attached to the support arm 62 such that threaded movement of the spindle relative to the barrel 90 will cause the support arm 62 to move toward and away from the cylinder 16. During an engraving process, such as a set-up engraving process, the engraved cell on the cylinder 16 is measured optically and a motor signal is generated to cause the motor 86 to move the shoe 66 within a plane intersecting the tip of the stylus 30 whereby the engraving head 18 may be located at a predetermined distance from the cylinder 16 to accurately obtain a desired cell depth.

It should also be noted that a control for detecting the travel limits of the spindle 92 is provided and includes a disc 98 mounted integrally with the end of the spindle 92 which is sensed by fore and aft proximity switches 100 and 102 for detecting the presence of the disc 98 at its extreme fore and aft positions.

Figure 7:
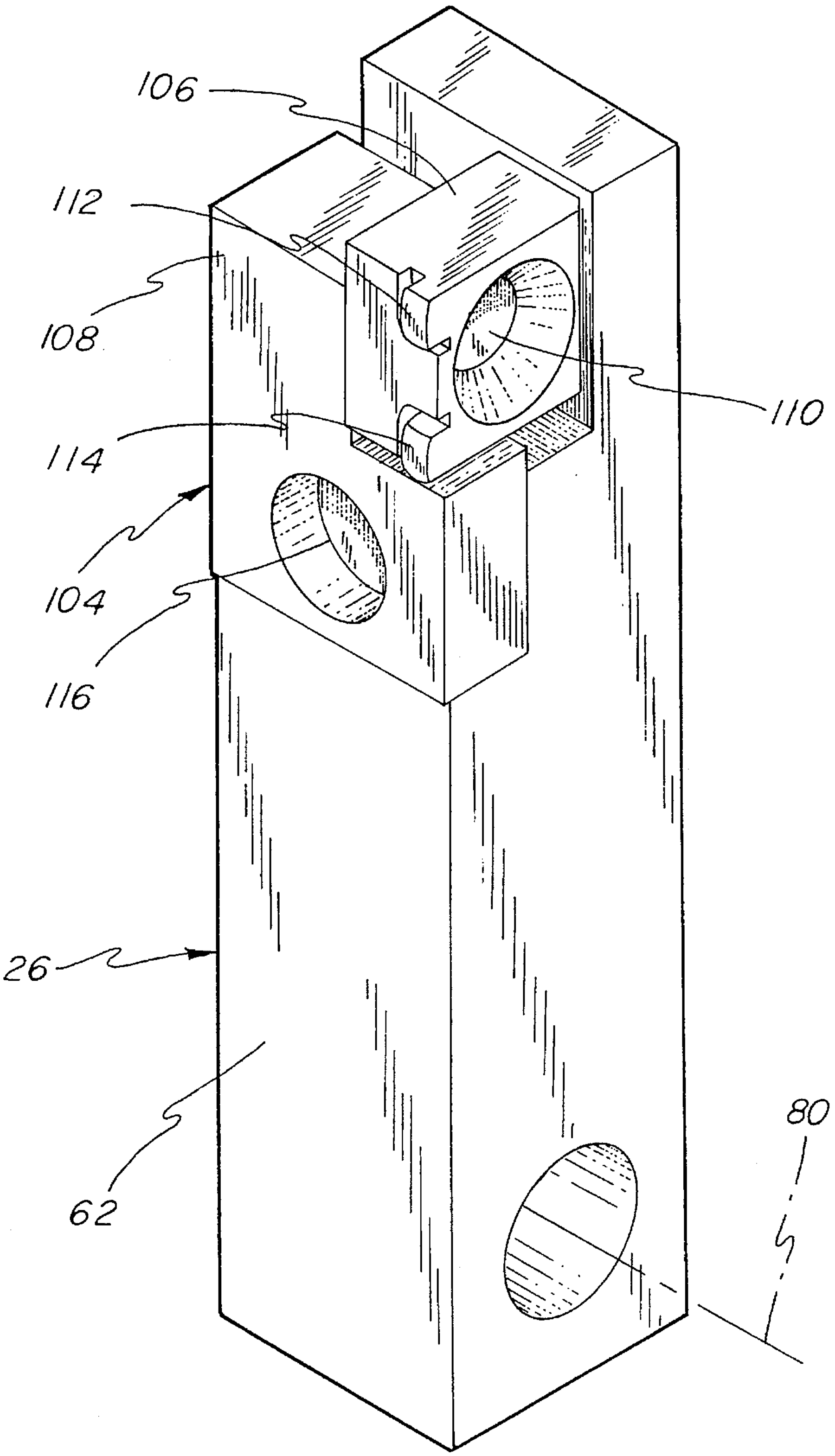
FIG. 7 is a perspective view of a second embodiment of the self-aligning shoe tool.
Figure 8:
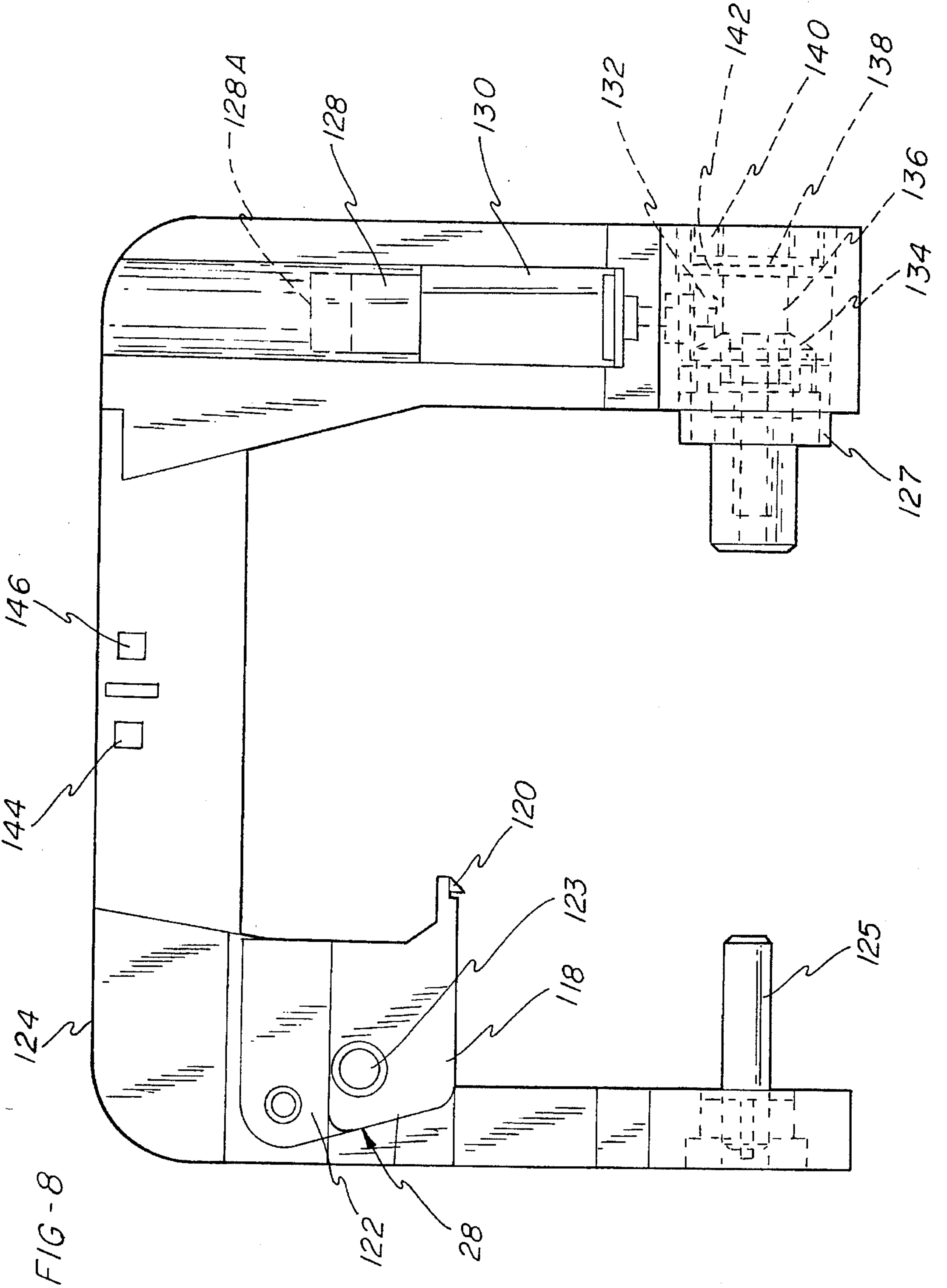
FIG. 8 is an elevational view of the burr cutter and associated mounting assembly for the present invention.

FIG. 7 illustrates an alternative configuration for the cartridge wherein the shoe tool assembly 26 is shown including a cartridge 104 carrying a diamond shoe 06 mounted to a shoe holder 108 by means of a horizontal pivot pin 110 whereby the diamond shoe 106 may pivot in a vertical plane. As with the diamond shoe 66, the present diamond shoe 106 includes first and second omnidirectional convex diamonds 112, 114. In addition, the cartridge 104 is detachably mounted to the support arm 62 by means of a pin 116.

The shoe cartridge 104 provides advantages similar to the previously described shoe cartridge 64 in that the diamond shoe 106 may pivot to automatically align with the surface of a cylinder 16 as the shoe 106 is moved into contact with the surface. In addition, the shoe 106 will follow circumferential irregularities in the cylinder whereby the circumferential following of the diamond shoe 106 over the cylinder 16 is significantly improved. Further, the cartridge design for supporting the diamond shoes 66, 106 of the present invention facilitates alternative use of the diamond shoes 66,106, without requiring replacement of parts other than the cartridges 64, 104 associated with the diamond shoes 66, 106. For example, the cartridge 64 may be detached from the arm 62 at the pin 76 and replaced by the cartridge 104.

It should be noted that in addition to providing better following of the cylinder, the present shoe design incorporating two omni-directional convex diamonds eliminates the need to align the shoes 66, 106 to the cylinder surface in that the shoes 66, 106 are self-aligning on their pivot axes, whereas in prior art devices it was necessary to manually align the single flat diamond shoe to be tangential to the cylinder surface in order to avoid scoring. Further, by incorporating two spaced convex contact surfaces for engaging the cylinder surface, it is now possible to perform multi-pass engraving operations without crushing or otherwise damaging the walls of cells formed on a previous pass of the engraving head, as could occur with the prior art ball-shaped shoe design.

It should be understood that the convex surfaces defined by the diamonds 68, 70, 112, 114 have a relatively large radius of curvature at any given point on the convex surfaces such that, when the diamonds 68, 70, 112,114 contact cells on the cylinder surface, the angle of contact is small and the diamonds will span a greater area than the prior ball shoe tools and will easily pass over the cell walls. In addition, the curvature of the diamonds ensures that the shoe will accurately follow small variations in the contour of the cylinder surface. Thus, the present shoe design provides for a distribution of forces exerted on the cylinder surface, thereby avoiding the damaging effects associated with prior shoe designs.

Referring to FIGS. 2 and 8–10, the burr cutter assembly 28 comprises a tool holder cartridge 118 which includes a diamond tool 120 for engaging and cutting away burrs of material created when the stylus 30 exits an engraved cell in the cylinder 16. The burr cutter assembly 28 further includes a cartridge holder 122 which is rigidly mounted to a support member or yoke 124 and which rigidly supports the tool holder cartridge 118 on the engraving head 18. In addition, the yoke 124 is supported for pivotal movement on the engraving head base 24 by means of pivot pins 125 and 127 to permit the tool 120 to follow any irregularities in the cylinder 16.

Figure 9:
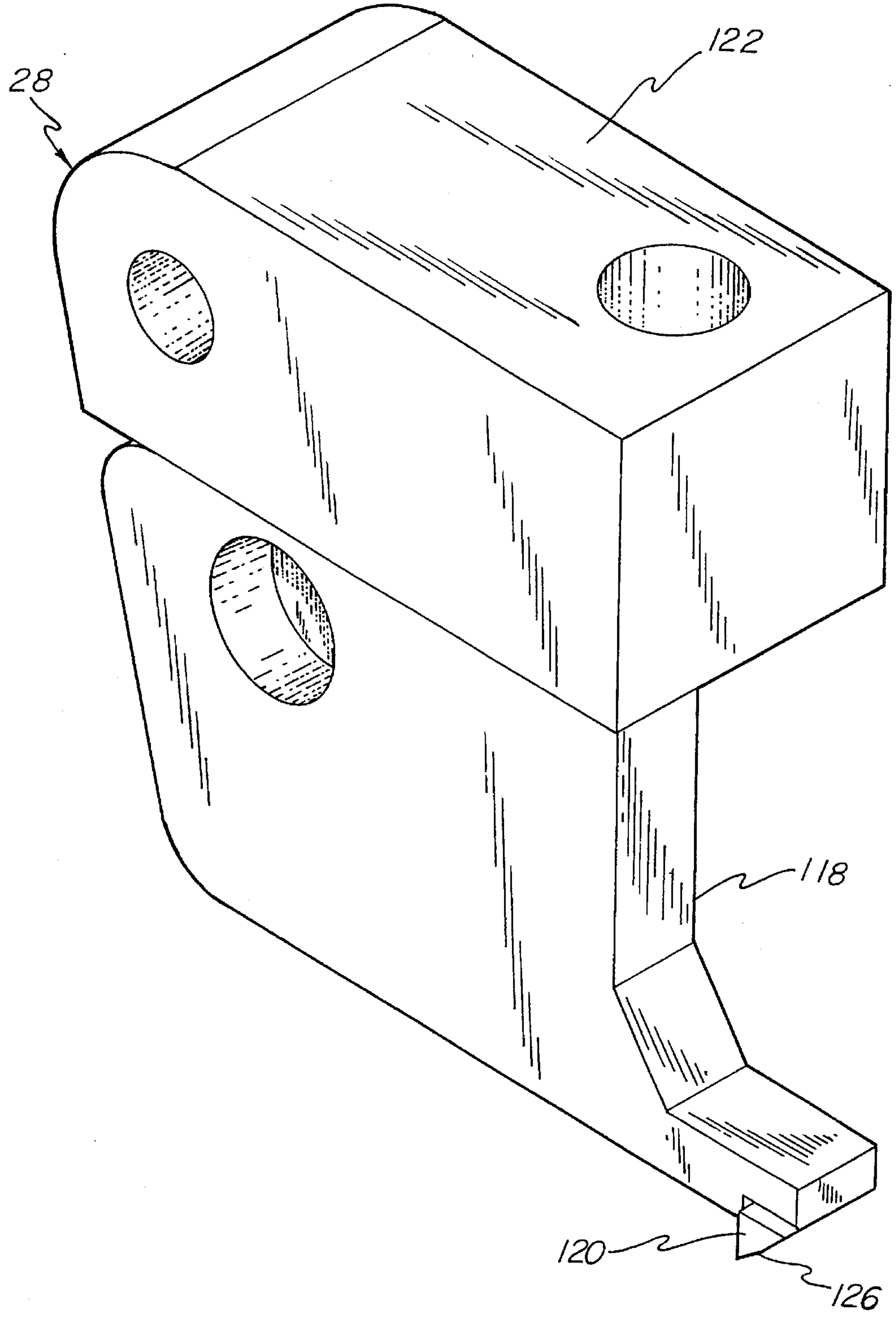
FIG. 9 is a perspective view of the cartridge holder and cartridge style tool holder assembly for the burr cutter.
Figure 10:
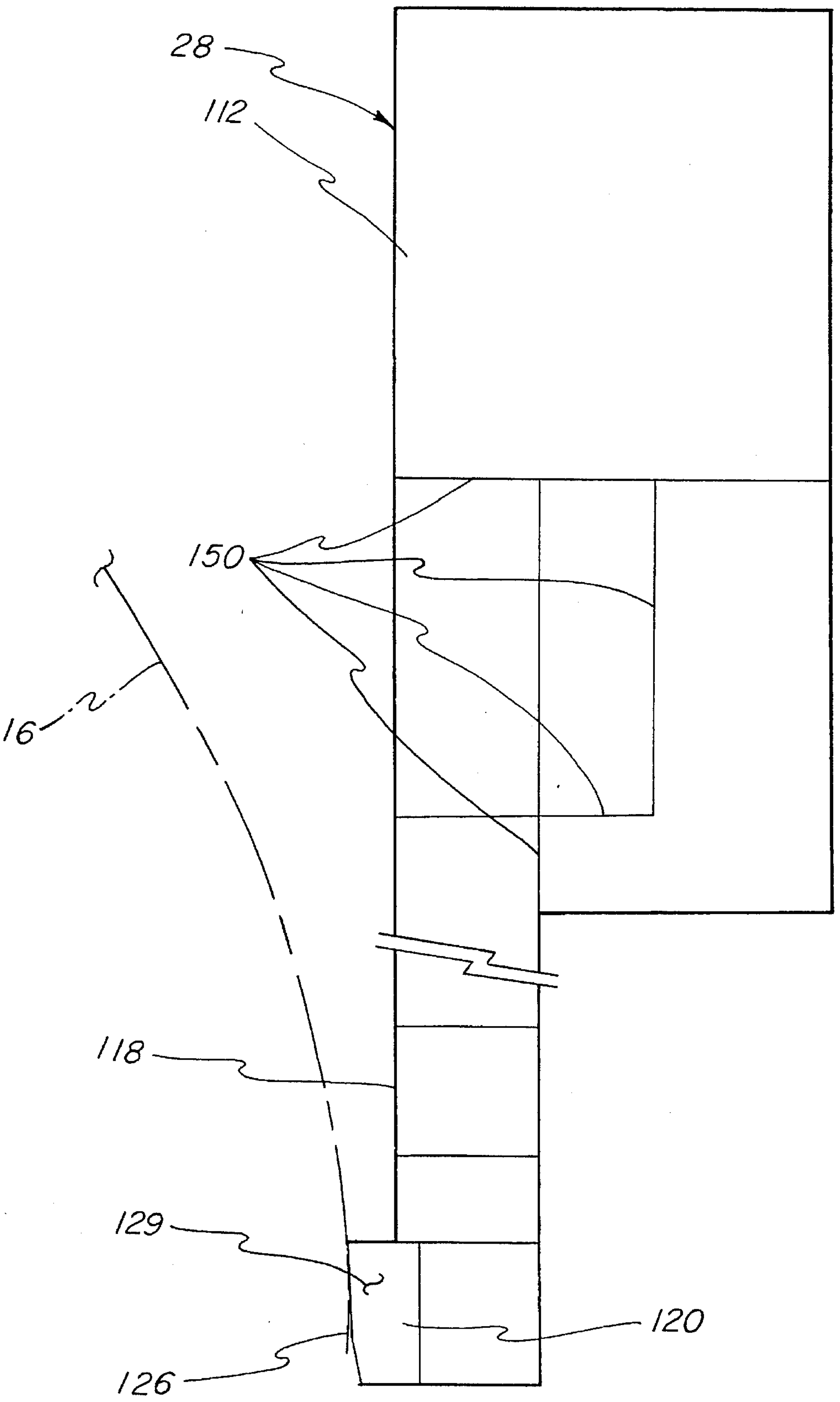
FIG. 10 is an elevational view of the cartridge holder and tool holder assembly of FIG. 9 taken from the tool side of the tool holder.

Referring to FIGS. 9 and 10, the diamond tool 120 includes a substantially planar facing surface 129 oriented perpendicular to the surface of the cylinder 16, in a radial direction, and extending at an acute angle relative to the axis of the cylinder, in an axial direction. One edge of the facing surface 129 defines an inclined cutting edge 126 for engaging the surface of the cylinder 16 at an acute angle. Further, the cutting edge 126 is convexly curved or radiused in order to accommodate a large range of cylinder diameters. Specifically, the cutting edge 126 is curved within a plane defined by the facing surface 129 such that as various cylinders of differing diameters are engraved, wherein the yoke 124 pivots toward or away from the cylinder depending on the cylinder diameter, the engagement point between the cylinder and the cutting edge 126 will move up or down the cutting edge 126 as a function of the diameter of the cylinder being engraved. By providing a radiused cutting edge 126, a tangential contact point will be established between the cutting edge 126 and the surface of the cylinder 16 regardless of the diameter of the cylinder. Thus, the present cutting edge 126 eliminates the need to manually align the burr cutter to be aligned tangential to the cylinder circumference, as would be required with a flat cutting edge, and permits the burr cutter to be used with a wide range of cylinder diameters.

The yoke 124 is provided with means to linearly move the diamond tool 120 axially of the cylinder 16 into alignment with the center of a desired cell or row of cells, such as the next-to-last row of engraved cells, on the cylinder 16. The means for locating the yoke 124 in a desired location includes a motor 128 and associated gear box 130 for rotating a bevel gear 132. The bevel gear 132 drives an associated bevel gear 134 which is fastened to a threaded spindle 136. The threads on the spindle 136 are engaged with the pivot pin 127 such that rotation of the spindle 136 causes the spindle 136 to move relative to the pin 127. In addition, a flanged head 138 of the spindle 136 is axially fixed in position relative to the yoke 124 and is free to rotate in a space defined between stop portions 140 and 142. Thus, as the motor 128 drives the gears 132 and 134, the yoke 124 will slide axially along the pivot pins 125 and 127.

The geometry of the diamond tool 120 is such that an exponential relationship exists between the cylinder diameter and the location of contact between the cutting edge 126 and the surface of the cylinder 16. Positioning of the diamond tool 120 over the center of the desired cell or row of cells, such as the next-to-last row of cells, is determined as a function of the motor speed, the gear reduction, and the time required to move the yoke 124 to locations spaced from proximity detectors 144, 146, which operate in conjunction with a sensor or sensors mounted in stationary relationship to the engraving head base 24.

In the preferred embodiment, the diameter of the cylinder being engraved is input to a controller, illustrated diagrammatically as element 148, for controlling the movement of the yoke 124, as well as the other aspects of the engraving process. The controller 148 includes a preprogrammed look-up table which correlates the desired point of contact between the diamond tool 120 and the cylinder surface to the cylinder diameter. The look-up table for the controller 148 may be established empirically and the values in the table are used to control actuation of the motor 128. For example, during positioning of the diamond tool 120 in the axial direction, the diameter of the cylinder being engraved is input to the controller 148, either manually by an operator or by means of an automatic system for sensing the cylinder diameter, and the controller 148 then moves the yoke 124 axially to an end or home position, as determined by one of the proximity detectors 144, 146. Using a value provided by the look-up table and corresponding to the cylinder diameter, the controller 148 then actuates the motor 128 for a predetermined time period and at a predetermined speed, which in turn results in the yoke moving axially to a desired location for precisely positioning the diamond tool 120.

In an alternative embodiment, the motor 128 may be provided with an encoder or a potentiometer, indicated diagrammatically by 128A, to provide the controller 148 with direct feedback as to the axial position of the yoke 124. Alternatively, a stepper motor may be used to rotate the bevel gear 132 by a predetermined angular amount whereby the location of the yoke 124 may be precisely controlled.

It should be noted that an advantage associated with the present burr cutter assembly 28, in addition to not requiring alignment relative to the surface of the cylinder 16, resides in the use of the tool holder cartridge 118 for holding the diamond tool 120 in that the cartridge 118 may be easily attached to and detached from the cartridge holder 122 at the pin 123 to thereby facilitate replacement of the diamond tool 120. In addition, the tool holder cartridge 118 and cartridge holder 122 have cooperating abutting surfaces engaged with each other at joint locations 150 such that the cartridge holder 122 includes datum surfaces for precisely locating the tool holder cartridge 118. Thus, the process of replacing the cartridge 118 is facilitated in that the cartridge holder 122 provides for automatic alignment of the cartridge 118 and associated diamond tool 120 relative to the engraving head 18 during installation of the cartridge 118.

As noted above, the controller 148 may be used for controlling various aspects of the engraving process, including positioning of the engraving head 18 at desired locations relative to the cylinder 16. To this end, the controller 148 may comprise a numerical control system and the engraving head may be provided with right and left optical proximity sensors 152, 154 for sensing the right and left ends of the cylinder 16, as well as the distance between the engraving head 18 and the cylinder 16. In addition, the driver 19 preferably includes a stepper motor or equivalent drive means controlled by the controller 148 to move the engraving head into operative relationship with the cylinder 16.

Thus, during a set-up operation, the head 18 would be actuated to move toward the cylinder 16 and, as the sensors 152, 154 sense the head 18 moving into close proximity with the cylinder 16, the movement of the head 18 may be slowed and stopped to provide for gentle engagement between the shoe tool assembly 26 and the cylinder 16. Further, the controller 148 is adapted to operate in conjunction with the sensors 152, 154 to sense the ends of the cylinder 16 for providing the controller 148 with a reference location whereby the controller 148 may determine where to begin a test cut at the initiation of the engraving process.

In addition, the controller 148 is also adapted to control the servomotor 86 for the shoe tool assembly 26 to locate the engraving head 18 at a predetermined distance from the cylinder 16, such that the operation of positioning the head 18 relative to the cylinder is substantially automated and requires a minimum of operator input.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A stylus assembly for use in an engraving apparatus, said stylus assembly comprising:

stylus means; and mounting means for receiving said stylus means, said mounting means including positioning means for cooperating with said stylus means to define a predetermined stop position for said stylus means, said recess means formed in stylus means for receiving a tool to facilitate movement of said stylus means away from said predetermined stop position.

2. The stylus assembly as in claim 1, including slot means formed in said mounting means for providing access to said recess means.

3. An engraving head for use in an engraver, comprising:

a stylus arm; and a holder situated on an end of said stylus arm for receiving a stylus and for registering said stylus relative to said engraving head.

4. The engraving head as in claim 3, wherein said holder comprises a plurality of cooperating walls which define a receiving aperture for receiving said stylus; whereby said stylus becomes angularly oriented and positively located in said stylus arm when said stylus is situated in said receiving aperture.

5. The engraving head as in claim 4, including at least one set screw for forcing said stylus into engagement with said cooperating walls of said receiving aperture.

6. The engraving head as in claim 3, wherein said stylus comprises a diamond mounted on a stylus holder, said stylus having a predetermined length whereby said diamond projects a predetermined distance from said stylus arm.

7. A stylus assembly for use in an engraving head of an engraver, said stylus assembly comprising:

a stylus cartridge;

a stylus arm including means defining an aperture for receiving said stylus cartridge; and an end wall located at an end of said aperture for engaging an end of said stylus cartridge whereby said stylus cartridge is located in a predetermined location on said stylus arm;

a recess formed in a surface of said stylus cartridge for receiving a tool to facilitate movement of said stylus cartridge away from said predetermined stop position.

8. The stylus assembly as in claim 7, including an elongated slot formed in said stylus arm for providing access to said recess.

9. A method of positioning a stylus on a stylus arm for an engraving head of an engraver, including the steps of:

providing a stylus; and moving said stylus into an aperture in said stylus arm in order to register said stylus in said aperture so that said stylus is positioned in a predetermined position in said engraving head.

10. The method as in claim 9, wherein said stylus includes opposing walls angled relative to each other and including the step of forcing said walls into wedging engagement with walls of said aperture.

11. The method as in claim 9, including the step of moving said stylus in a direction transverse to a longitudinal axis of said stylus to thereby position said stylus in a predetermined angular orientation.

12. A method of positioning a stylus on a stylus arm for an engraving head of an engraver, including the steps of:

providing a stylus; and moving said stylus into an aperture in said stylus arm in order to align said stylus in said aperture so that said stylus is positioned a predetermined distance relative to a cylinder in said engraver, wherein said stylus includes a wall having a recess formed therein and including the step of engaging said recess with a tool and moving said stylus out of said aperture.

13. A shoe assembly for use on an engraving head in an engraving apparatus, said shoe assembly comprising:

a support situated on said engraving head; and a shoe means detachably secured to said support such that when said shoe means is secured to said support, said shoe means becomes self-aligned on said engraving head.

14. The shoe assembly as in claim 13, wherein said shoe means includes two non-planar contact means located in spaced relation to each other for engaging a surface to be engraved.

15. The shoe assembly as in claim 14, wherein said shoe means rotates relative to said support about a shoe pivot axis perpendicular to a plane containing both of said contact means whereby said shoe means is self aligning relative to a surface to be engraved.

16. The shoe assembly as in claim 15, wherein said support pivots about a support pivot axis.

17. The shoe assembly as in claim 16, wherein said shoe pivot axis is perpendicular to said support pivot axis.

18. The shoe assembly as in claim 16, wherein said shoe pivot axis is parallel to said support pivot axis.

19. The shoe assembly as in claim 16, including means for actuating said support for pivotal movement toward and away from said surface to be engraved.

20. The shoe assembly as in claim 13, wherein said contact means comprises at least one omni-directional convex diamond.

21. The shoe assembly as in claim 13, including detachable means for detachably coupling said shoe means to said support.

22. A shoe assembly for use in an engraving head of an engraver wherein said shoe assembly is adapted to engage a surface to be engraved to maintain a predetermined spacing between said engraving head and said surface, said shoe assembly comprising:

a support arm; and a shoe tool detachably supported on said support arm such that when said shoe tool is secured to said support arm, said shoe tool becomes registered in said engraving head.

23. The shoe assembly as in claim 22, wherein said shoe tool includes first and second non-planar contact surfaces.

24. The shoe assembly as in claim 23, wherein said contact surfaces are defined by omni-directional convex diamonds.

25. The shoe assembly as in claim 23, including a shoe holder wherein said shoe tool is attached to said shoe holder at a pivot point defining a shoe tool pivot axis, and said shoe holder and said shoe tool define a cartridge assembly which is detachably attached to said support arm, said shoe pivot axis being perpendicular to a plane containing said first and second contact surfaces whereby said shoe tool is self aligning relative to a surface to be engraved.

26. The shoe assembly as in claim 25, wherein said support arm is mounted for movement about a support arm pivot axis.

27. The shoe assembly as in claim 26, wherein said shoe tool pivot axis is perpendicular to said support arm pivot axis.

28. The shoe assembly as in claim 26, wherein said shoe tool pivot axis is parallel to said support arm pivot axis.

29. The shoe assembly as in claim 26, including a motor actuator for actuating said support arm for movement toward and away from said surface to be engraved.

30. A method of positioning an engraving head relative to a surface to be engraved, including the steps of:

providing a shoe tool that becomes registered when mounted on said engraving head;

mounting said shoe tool on said engraving head; and moving said shoe tool into contact with a surface to be engraved whereby said shoe tool is caused to self align with said surface to be engraved.

31. The method as in claim 30, wherein said shoe tool is supported on a support arm for pivotal movement relative to said support arm to facilitate self alignment of said shoe tool.

32. The method as in claim 31, wherein said surface to be engraved is a cylindrical surface moving relative to said shoe tool, and including the step of said shoe tool pivoting to accommodate surface irregularities in said cylindrical surface.

33. The method as in claim 31, wherein said support arm is mounted for pivotal movement relative to said engraving head and said step of moving said shoe tool into contact with said surface includes the step of pivoting said support arm to establish a predetermined spacing between said engraving head and said surface to be engraved.

34. The method as in claim 30, wherein said step of moving said shoe tool into contact with said surface comprises establishing two contact points between said shoe tool and said surface wherein said contact points are located in spaced relation to each other.

35. The method as in claim 30, wherein said shoe tool is pivotally mounted to a tool holder to define a cartridge assembly which is attached to said support arm and including the step of detaching said cartridge assembly from said support arm and replacing said cartridge assembly with a different cartridge assembly.

36. A burr cutting assembly for use in an engraving apparatus for engraving a cylinder having an axis, said cutting assembly comprising:

tool means having a cutting edge for cutting and removing burrs on an engraved surface;

driver means for moving said tool means axially such that the cutting edge is moved into operative relationship with a desired location on a surface of said cylinder; and a controller operatively connected to said driver means wherein said controller is operable for energizing said driver means to move said cutting edge into said operative relationship.

37. The cutting assembly as in claim 36, wherein said tool means comprises a diamond tool.

38. The cutting assembly as in claim 36, including tool holder means for holding said tool means.

39. The cutting assembly as in claim 38, including support means wherein said tool holder means is detachably attached to said support means.

40. The cutting assembly as in claim 39, including means for automatically aligning said tool holder means in a predetermined position on said support means.

41. The cutting assembly as in claim 36, wherein said control means causes said driver means to move said tool means in an axial direction to automatically position said cutting edge at a predetermined axial location on said cylinder.

42. A burr cutting assembly for use in an engraving apparatus for engraving a cylinder having an axis, said cutting assembly comprising:

tool means having a cutting edge for engaging and cutting burrs on an engraved surface;

driver means for moving said tool means axially such that the cutting edge is moved into operative relationship with a desired location on a surface of said cylinder; and a controller operatively connected to said driver means wherein said controller is operable for energizing said driver means to move said cutting edge into said operative relationship;

wherein said tool means includes a substantially planar facing surface inclined at an acute angle relative to said axis and said cutting edge is curved and lies in a plane defined by said facing surface.

43. A burr cutting assembly for use in an engraving head of an engraver for engraving a cylinder having an axis, said cutting assembly comprising:

a tool having a cutting edge;

a tool holder for supporting said tool in engagement with the surface of a cylinder;

a driver for supporting said tool holder, said driver being operable to move said tool holder relative to said cylinder;

a controller operatively connected to said driver; and wherein said cutting edge is curved and is inclined at an acute angle relative to said axis and said controller is operable to actuate said driver for automatically positioning said cutting edge into tangential engagement with a desired location on a surface of said cylinder.

44. The cutting assembly as in claim 43, wherein said tool comprises a diamond tool.

45. The cutting assembly as in claim 43, wherein said tool includes a substantially planar facing surface supported in substantially perpendicular relationship to a surface of said cylinder, and said cutting edge lies in a plane defined by said facing surface.

46. The cutting assembly as in claim 45, wherein said facing surface is oriented at an acute angle relative to an axis of rotation for said cylinder.

47. The cutting assembly as in claim 43, including a support for supporting said tool holder, said support being operatively connected to said driver for movement in a linear direction parallel to an axis of rotation for said cylinder.

48. The cutting assembly as in claim 47, wherein said support is mounted for pivotal movement toward and away from said cylinder.

49. The cutting assembly as in claim 47, including means for providing an input to said controller corresponding to the location of said support on said engraving head.

50. The cutting assembly as in claim 49, including means for providing said controller with an input corresponding to the diameter of said cylinder wherein said controller actuates said driver to move said support to a predetermined location on said engraving head related to said input corresponding to the diameter of said cylinder.

51. The cutting assembly as in claim 43, wherein said tool holder is detachably and rigidly attached to said support.

52. The cutting assembly as in claim 51, wherein said support includes datum surfaces for engagement with said tool holder whereby said tool holder is aligned in a fixed predetermined position relative to said support.

53. A method of removing burrs from a plurality of engraved cylinders, including the steps of:

providing a tool having a curved cutting edge;

supporting said cutting edge in contact with the surface of a cylinder at an angle relative to an axis of said cylinder;

providing a driver for moving said tool to a desired location relative to said cylinder;

providing a controller operatively connected to said driver for actuating said driver to move said cutting edge to a desired location on said cylinder; and rotating said cylinder past said tool to thereby remove burrs.

54. The method as in claim 53, wherein said curvature of said curved edge lies in a plane perpendicular to the surface of said cylinder whereby said tool is self adjusting for operating on cylinders of different diameters.

55. The method as in claim 54, wherein said plane lies at an acute angle relative to an axis of rotation for said cylinder.

56. The method as in claim 53, wherein said tool is supported on an engraving head by a pivotally mounted support member and including the step of said support member moving toward and away from said engraving head to follow variations in the surface of said cylinder.

57. The method as in claim 56, including the step of causing said tool to engage a plurality cylinders having different diameters at tangential contact points wherein said cutting edge remains at a fixed orientation relative to said support member.

58. The method as in claim 56, including the step of said controller actuating said driver to move said support member parallel to an axis of rotation for said cylinder whereby said tool is moved to a desired position over a cell engraved by said engraving head.

59. The method as in claim 58, wherein said step of moving said support member parallel to an axis of rotation for said cylinder includes inputting the diameter of said cylinder into said controller, and said controller actuating said driver to position said tool at said desired position as a function of said cylinder diameter.

60. An engraving head for engraving a plurality of cylinders, said engraving head comprising:

a stylus assembly including a stylus arm having means defining an aperture, a stylus cartridge mounted in said aperture for engraving cells in the surface of a cylinder, and an end wall located at an end of said aperture for engaging an end of said stylus cartridge whereby said stylus cartridge is located in a predetermined location on said stylus arm;

a shoe assembly including a support arm and a shoe tool supported on said support arm, said shoe tool including at least on non-planar contact surface for engaging said surface of a cylinder; and a burr cutting assembly including a cutting tool having a cutting edge and a tool holder for supporting said cutting tool in engagement with said surface of a cylinder wherein said cutting edge is curved such that said cutting edge is capable of engaging a plurality of cylinder surfaces in tangential relationship.

61. The engraving head as in claim 60, wherein said stylus cartridge is formed with a trapezoidal cross section for engaging cooperating walls of said aperture in wedging contact whereby said stylus cartridge is angularly oriented and positively located in said stylus arm.

62. The engraving head as in claim 60, wherein said shoe tool includes first and second omni-directional convex diamonds located in spaced relation to each other, and said shoe tool is mounted for pivotal movement about an axis perpendicular to a plane containing said first and second diamonds.

63. The engraving head as in claim 60, wherein said cutting tool includes a substantially planar facing surface supported in substantially perpendicular relationship to said surface of a cylinder, and said cutting edge lies in a plane defined by said facing surface.

64. The engraving head as in claim 60, including proximity sensors for sensing the location of said engraving head relative to a cylinder, and a controller for receiving signals from said proximity sensors and for controlling movements of said engraving head.

65. An engraver for engraving a cylinder, said engraver comprising:

an engraving head;

a sensor mounted on said engraving head for sensing the position of said engraving head relative to a cylinder and for generating a feedback signal corresponding thereto;

a driver for moving said engraving head; and a controller for energizing said driver to move said engraving head into operative relation with said cylinder wherein said controller automatically stops said engraving head at a predetermined position relative to said cylinder in response to said feedback signal.

66. A method of moving an engraving head into position relative to a cylinder, comprising the steps of:

providing a driver and a sensor operatively coupled to a controller for controlling movement of said engraving head;

causing said driver to move said engraving head toward said cylinder;

sensing the position of said engraving head relative to said cylinder with said sensor; and stopping movement of said engraving head in response to the sensed position of the engraving head when said engraving head has been moved to a desired position.

67. The method as in claim 66, wherein said sensing step further comprises the step of:

sensing the ends of said cylinder.

68. The method as in claim 66, wherein said sensing step further comprises the step of:

sensing the distance between said engraving head and said cylinder.

69. The method as in claim 68, wherein said sensing step is effected using at least one optical sensor which is positioned on the engraving head.

70. An engraving component for use on an engraving head in an engraver comprising:

at least one holder; and at least one detachable component for detachably mounting to said at least one holder such that said at least one detachable component becomes registered in a predetermined position in said engraving head.

71. The engraving component as recited in claim 70 wherein said at least one detachable component comprises a stylus.

72. The engraving component as recited in claim 70 wherein said at least one detachable component comprises a burr cutter.

73. The engraving component as recited in claim 70 wherein said at least one detachable component comprises a shoe.

74. The engraving component as recited in claim 71 wherein said at least one detachable component further comprises a burr cutter.

75. The engraving component as recited in claim 75 wherein said at least one detachable component further comprises a shoe.

76. The engraving component as recited in claim 71 wherein said stylus is trapezoidal in cross section.

77. The engraving component as recited in claim 73 wherein said shoe comprises a non-planar contact.

78. The engraving component as recited in claim 73 wherein said shoe comprises a plurality of non-planar contacts.

79. The engraving component as recited in claim 77 wherein said non-planar contact is pivotable.

80. The engraving component as recited in claim 77 wherein said non-planar contact comprises an omni-directional convex diamond.

81. The engraving component as recited in claim 72 wherein said burr cutter comprises an arcuate cutting edge.

82. The engraving component as recited in claim 70 wherein said at least one holder is integral with said at least one component.

83. A method for registering at least one component in an engraving head used in an engraver, comprising the steps of:

selecting at least one component;

providing a cartridge capable of supporting said at least one component;

mounting said at least one component to said cartridge such that when said cartridge and said at least one component are mounted on said engraving head, said at least one component becomes registered in a predetermined position on said engraving head.

84. The method as recited in claim 83, further comprising:

selecting a stylus.

85. The method as recited in claim 84, wherein said cartridge comprises a stylus holder having an aperture which is trapezoidal cross section, said method further comprising:

situating said stylus in said stylus in said aperture.

86. The method as recited in claim 85 wherein said at least one component comprises a burr cutter, said method further comprising:

situating said burr cutter on said cartridge before said cartridge is mounted on said engraving head.

87. The method as recited in claim 83 wherein said at least one component is a shoe.

88. The method as recited in claim 83 wherein said method comprises the step of:

situating a plurality of cartridges on said engraving head.

89. A shoe component for use in an engraving head situated on an engraver, comprising:

a holder; and a shoe coupled to said holder, said shoe comprising a non-planar contact surface for engaging a surface of a cylinder situated in the engraver when the engraving head engraves the cylinder.

90. The shoe component as recited in claim 89 wherein said non-planar contact surface is generally convex in cross section.

91. The shoe component as recited in claim 90 wherein said non-planar contact surface is spherical.

92. The shoe component as recited in claim 89 wherein said non-planar contact surface comprises a plurality of contact surfaces.

* * * * *